United States Patent
Braun et al.

(10) Patent No.: US 6,973,108 B2
(45) Date of Patent: Dec. 6, 2005

(54) ARRANGEMENT FOR PUMPING AN ANISOTROPIC LASER CRYSTAL

(75) Inventors: Bernd Braun, Jena (DE); Guenter Hollemann, Jena (DE)

(73) Assignee: JENOPTIK Laser, Optik, Systeme GmbH, Jena (DE)

( * ) Notice: Subject to any disclaimer, the term of this patent is extended or adjusted under 35 U.S.C. 154(b) by 345 days.

(21) Appl. No.: 10/268,321

(22) Filed: Oct. 10, 2002

(65) Prior Publication Data

US 2003/0091078 A1 May 15, 2003

(30) Foreign Application Priority Data

Oct. 26, 2001 (DE) ......................................... 101 54 007

(51) Int. Cl.[7] .............................. H01S 3/16; H01S 3/04
(52) U.S. Cl. ........................................... 372/41; 372/34
(58) Field of Search .............................. 372/19, 34, 41, 372/69, 71

(56) References Cited

U.S. PATENT DOCUMENTS

| | | | | |
|---|---|---|---|---|
| 5,103,457 A | * | 4/1992 | Wallace et al. ................ | 372/92 |
| 5,127,068 A | | 6/1992 | Baer et al. | |
| 5,561,547 A | * | 10/1996 | Keirstead et al. ........... | 359/288 |
| 5,651,020 A | * | 7/1997 | Nighan et al. ................ | 372/92 |
| 5,748,664 A | | 5/1998 | Dunn et al. | |

(Continued)

FOREIGN PATENT DOCUMENTS

| | | |
|---|---|---|
| DE | 19521943 | 12/1996 |
| DE | 69501950 | 7/1998 |
| EP | 0 310 241 | 4/1989 |
| JP | 06 132 586 | 5/1994 |
| JP | 07 079 039 | 3/1995 |

(Continued)

OTHER PUBLICATIONS

D. C. Shannon and R. W. Wallace, "High-power Nd:YAG laser end pumped by a CW, 10mm×1 $\mu$m aperture, 10-W laser-diode bar", *Optics Letters*, vol. 16 (1991): 318–320.

V. N. Bykov, et al., "Cylindrical resonator with an Internal astigmatic medium", *Soviet Journal of Quantum Electronics*, vol. 14 (1984): 483–486.

F. Krausz, J. Zehetner, T. Brabec, E. Wintner, "Elliptic-mode cavity for diode-pumped lasers", *Optics Letters*, vol. 16 (1991): 1496–1498.

XP 000520898—D. Kopf, et al., "400 mW continuous-wave diode-pumped Cr:LiSAF laser based on a power scalable concept", *Optics Letters*, vol. 20 (1995): 1782–1784.

XP 000679188—D. Kopf, et al., "1.1 W CW Cr:LiSAF laser pumped by a 1-cm diode array", *Optics Letters*, vol. 22 (1997): 99–101).

(Continued)

*Primary Examiner*—Don Wong
*Assistant Examiner*—Hung Tran Vy
(74) *Attorney, Agent, or Firm*—Reed Smith LLP

(57) ABSTRACT

The object in an arrangement for pumping an anisotropic laser crystal is to reduce the influence of the destruction limit of the laser crystal on increased pump power density and, in this connection, to achieve improved beam quality and increased efficiency of a diode-pumped solid state laser. At the same time, the pump volume and cross-sectional area are to be kept as small as possible along a length of the crystal corresponding at least approximately to the absorption length. The arrangement operates with an asymmetric pump beam whose pump beam cross section has different dimensions perpendicular to one another and with a laser beam cross section which is adapted to this asymmetry. That axis of the crystallographic axes of the anisotropic laser crystal in whose direction the highest value of the crystal breaking limit exists is oriented along the greatest temperature gradient in the direction of the smaller dimension of the pump beam cross section.

8 Claims, 2 Drawing Sheets

U.S. PATENT DOCUMENTS

| | | | | |
|---|---|---|---|---|
| 5,907,570 | A | * | 5/1999 | Nighan et al. ............... 372/41 |
| 6,222,869 | B1 | * | 4/2001 | Marshall et al. ............. 372/75 |
| 6,241,720 | B1 | * | 6/2001 | Nighan et al. ............... 606/3 |
| 6,417,955 | B1 | * | 7/2002 | Kafka et al. ............... 359/333 |
| 6,526,073 | B1 | * | 2/2003 | Spinelli et al. ............. 372/22 |
| 2001/0028671 | A1 | | 10/2001 | Cheng et al. |

FOREIGN PATENT DOCUMENTS

| | | |
|---|---|---|
| WO | WO 95/21479 | 8/1995 |
| WO | WO 96/13884 | 5/1996 |
| WO | WO 00/77893 | 12/2000 |

OTHER PUBLICATIONS

XP 000705622—J.M. Eggleston, et al., "The Slab Geometry Laser—Part I: Theory" IEEE Journal of Quantum Electronics, IEEE Inc. NY/US, Mar. 1, 1984, pp. 289–301.

XP 000880905—Y.F. Chen, et al., "Efficient High–Power Diode–End–Pumped $TEM_{00}$ $Nd:YVO_4$ Laser" IEEE Photonics Technology Letters, IEEE Inc. NY/US Oct. 10, 1999, pp. 1241–1243.

F. Krausz et al. "Elliptic–mode cavity for diode–pumped lasers" Optics Letters/vol. 16, No. 19/ Oct. 1, 1991.

D.C. Shannon et al. "High–power Nd: YAG laser end pumped by a cw, 10mm X $1\mu$m aperture, 10–W laser–diode bar" Optics Letters/vol. 16, No. 5/ Mar. 1, 1991.

V. N. Bykov et al. "Cylindrical resonator with an internal astigmatic medium" Institute of Radio Engineering, Electronics, and Automation, Moscow/ May 17, 1983.

English Abstract of DE 19521943, no date.
English Abstract of DE 69501950, no date.
English Abstract of JP 06 132 586, no date.
English Abstract of JP 07 079 039, no date.

* cited by examiner

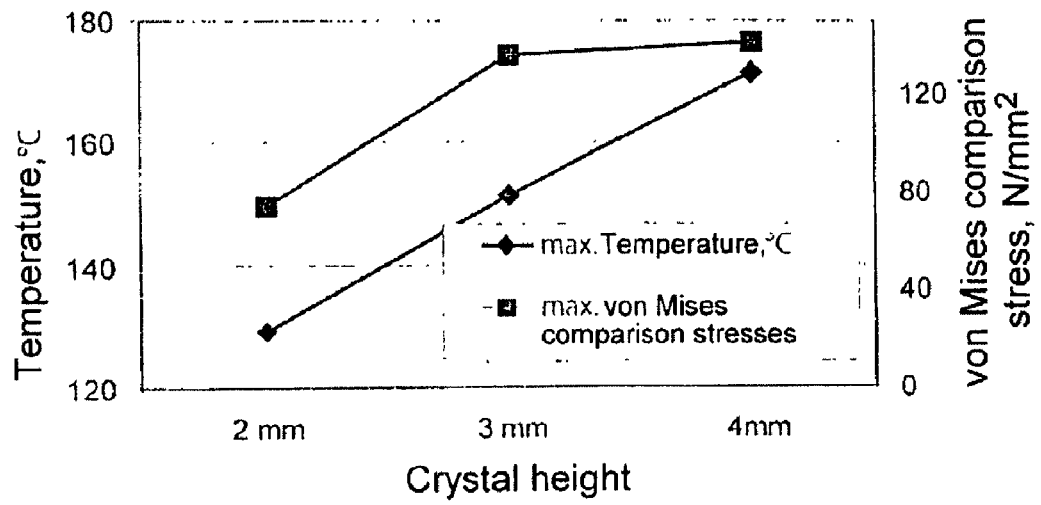
Fig. 5
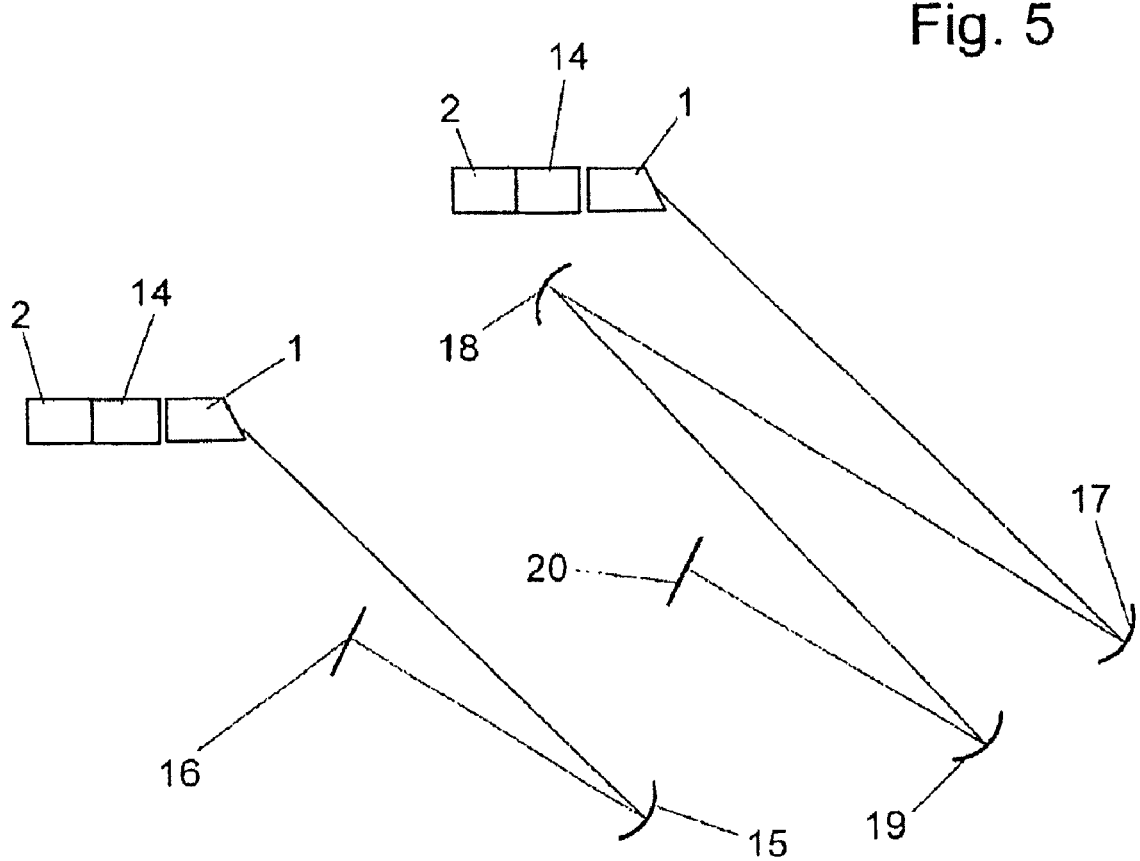
Fig. 6
Fig. 7

ARRANGEMENT FOR PUMPING AN ANISOTROPIC LASER CRYSTAL

CROSS-REFERENCE TO RELATED APPLICATIONS

This application claims priority of German Application No. 101 54 007.8, filed Oct. 26, 2001, the complete disclosure of which is hereby incorporated by reference.

BACKGROUND OF THE INVENTION a) Field of the Invention

The invention is directed to an arrangement for pumping an anisotropic laser crystal with an asymmetric pump beam whose cross section has different dimensions perpendicular to one another and with a laser beam cross section which is adapted to this asymmetry.

b) Description of the Related Art

When a solid state laser crystal in a laser cavity is to be pumped by means of diode lasers, it is necessary to adapt the expansion of the laser beam to the expansion of the pump laser beam within the pump volume in order to generate diffraction-limited beam quality. Further, solid state lasers require a high pump power density for high efficiency; however, the pump power density is often limited by the low strength of the laser crystal because the latter forms cracks even at low pump power densities and can be destroyed in this way. This applies particularly to neodymium-doped yttrium orthovanadate ($Nd:YVO_4$) crystals which have a substantially smaller modulus of elasticity compared to Nd:YAG.

As is well known, diode lasers have very different beam characteristics in directions perpendicular to one another which are handled differently when pumping a solid state laser. Either the pump beam is adapted, with losses, to the cavity beam in a complicated and cost-intensive manner or a concept is selected whereby the beam characteristics of the diode laser which differ in the fast-axis direction and slow-axis direction are left alone and the cavity beam is adapted to the highly asymmetric pump beam instead.

For applying the first concept, it is known to shape a round beam cross section from the highly asymmetric beam cross section of the diode laser by means of astigmatic imaging optics in the focus of the pump beam. An arrangement of this type is disadvantageous in that the focusability of the diode laser is limited by the beam parameter product in the direction of the slow axis and the improved focusability is "wasted" in the direction of the fast axis.

Higher luminance is achieved when the individual emitters are coupled into fibers and the fibers are combined to form a fiber bundle, since the beam parameter products are averaged in this way and the radiating surface no longer contains the distance of the emitters relative to one another (U.S. Pat. No. 5,127,068). However, the complicated, expensive and lossy coupling of each individual emitter into a fiber reduces the absorption efficiency when pumping anisotropic crystals because a depolarization of the pump radiation is effected in the fibers.

In another known solution, the radiation of the individual emitters can be rearranged by means of step mirrors (WO 96/13884) so that there is an average value of the original beam parameter products in directions extending perpendicular to one another. This concept is usually used in connection with a fiber coupling which, in addition, causes a homogenization over the beam cross section.

The problems mentioned above occur again with losses of up to 40% compared to a diode laser without adapting means.

Losses of this kind at the expense of beam symmetry do not occur in the second concept mentioned above, but additional optical elements are required in the cavity for adapting the laser beam to the pump beam. For example, the use of anamorphotic prisms is known from U.S. Pat. No. 5,103,457 and from D. C. Shannon and R. W. Wallace, "High-power Nd:YAG laser end pumped by a CW, 10 mm×1 μm aperture, 10-W laser-diode bar", Optics Letters, Vol. 16 (1991): 318–320. In contrast, cylindrical mirrors are used in V. N. Bykov, et al., "Cylindrical resonator with an internal astigmatic medium", Soviet Journal of Quantum Electronics, Vol. 14 (1984): 483–486; F. Krausz, J. Zehetner, T. Brabec, E. Wintner, "Elliptic-mode cavity for diode-pumped lasers", Optics Letters, Vol. 16 (1991): 1496–1498, and in D. Kopf, et al., "400 mW continuous-wave diode-pumped Cr:LiSAF laser based on a power scalable concept", Optics Letters, Vol. 20 (1995): 1782–1784. In extreme cases, the axial ratio can be 1:10 or more with the assistance of cylindrical mirrors (WO 00/77893 and D. Kopf, et al., "1.1 W CW Cr:LiSAF laser pumped by a 1-cm diode array", Optics Letters, Vol. 22 (1997):99–101).

In the second concept, although the luminance of the diode laser is maintained, the required intracavity astigmatic or anamorphotic elements have a negative effect on the process. Further, the sharp focusing in the direction of the fast axis complicates handling of the cavity which is particularly sensitive to tilting.

U.S. Pat. No. 5,561,547 makes do without additional astigmatic elements in the cavity, and the degree of ellipticity of the thermal lens induced by pumping in an anisotropic laser crystal such as $Nd:YVO_4$ crystal is controlled. The laser crystal is end-pumped by a round pump beam of a fiber-coupled diode laser and is held and cooled at opposite surfaces extending perpendicular to the C-axis of the crystal, while opposite surfaces extending perpendicular to the A-axis are thermally insulated. Since the heatsink technique gives a circular shape to the thermal lens in the anisotropic $Nd:YVO_4$ crystal, a substantially round exit beam is generated. The disadvantage in this solution consists in that costly beam-shaping techniques are necessary again in order to generate a round pump beam.

SUMMARY OF THE INVENTION

The invention may reduce the influence of the destruction limit of the laser crystal on increased pump power density and, in this connection, to achieve improved beam quality and increased efficiency of a diode-pumped solid state laser. At the same time, the pump volume and cross-sectional area are to be kept as small as possible along a length of the crystal corresponding at least approximately to the absorption length.

According to the invention, an arrangement of the type mentioned in the beginning in that that axis of the crystallographic axes of the anisotropic laser crystal in whose direction the highest value of the crystal breaking limit exists is oriented along the greatest temperature gradient in the direction of the smaller dimension of the pump beam cross section.

In the anisotropic crystal having a crystal cross section which is penetrated by the pump beam and which has pairs of oppositely located, parallel crystal edges with edge lengths which differ from one another at least in part of the laser crystal, a directed heat flow is generated in that the anisotropic laser crystal has its largest thermal coefficient in direction of the smaller dimension of the pump beam cross section and parallel to the crystal edge with the shorter edge length.

While partly retaining a defined asymmetry of the pump beam in order to achieve a high pump power density, orientation steps which deviate entirely from the prior art are used for adapting the laser beam to this asymmetry. The asymmetry of the heat flow produced by the reduced crystal dimensions in direction of the smaller dimension of the pump beam cross section and the asymmetry of the thermal lens resulting from this can be adapted to the cavity in such a way that an asymmetric laser mode that is adapted to the asymmetric pump mode is realized in the interior of the crystal without requiring additional astigmatic elements in the cavity, i.e., without requiring the use of different beam-shaping means for the different axes.

Further, it was found that particularly favorable thermoelastic properties in the form of improved fracture strength characteristics are connected with the orientation steps and the construction of the laser crystal, so that the laser crystal can be adapted for receiving higher pump power densities compared to known pump arrangements. Further, a substantial improvement can be achieved in the temperature ratios in the center of the crystal of the anisotropic laser crystal. In particular, the reduction in the maximum temperature in that location has a positive effect on an increased efficiency of the laser transition due to reduced thermal loading.

The asymmetric thermal lens is used to generate an elliptic laser beam cross section in the interior of the laser crystal having an axial ratio greater than 1:1 and less than 1:3. This axial ratio can be further increased by the factor of the ratio of the index of refraction of the laser crystal to the index of refraction of air by means of a Brewster-cut beam outlet surface of the laser crystal.

When an Nd-YVO$_4$ crystal is used as anisotropic crystal, it is oriented in such a way through application of the invention that the a-axis extends in direction of the smaller dimension of the pump beam cross section (parallel to the fast axis) and the c-axis extends in direction of the larger dimension of the pump beam cross section (parallel to the slow axis).

In contrast to the preferred heatsink technique and the optimization of the crystal cross section according to U.S. Pat. No. 5,561,547, a heat flow which is mainly directed parallel to the c-axis for generating homogeneous thermal properties is avoided. Instead, a greater freedom is achieved with respect to the adjustment of parameter such as crystal orientation and crystal geometry by doing away with the round thermal lens and the radially symmetric cavity beam in the crystal. Anisotropic crystal characteristics are not compensated; rather, in a Brewster-cut laser crystal, the dimensioning of the laser crystal in direction of the smaller dimension of the pump beam is reduced in relation to that in the direction perpendicular thereto in order to meet the above-stated object of the invention.

A diode laser with a line-shaped arrangement of individual emitters and fast-axis and slow-axis collimators can advantageously be used to generate the asymmetric pump beam. The slow-axis collimator comprises individual lenses which are arranged in a plane of the beam intersection of the beam bundles emitted by the individual emitters.

The asymmetry occurring in the output beam can be limited to less than 10% by a suitable design of the cavity and/or can be compensated in its entirety by off-axis reflection at a curved mirror.

The invention will be explained more fully in the following with reference to the schematic drawings.

BRIEF DESCRIPTION OF THE DRAWINGS

In the drawings:

FIG. 5 shows the curve of temperature and von Mises comparison stresses at a function of crystal height;

FIG. 6 shows a cavity configuration for CW laser operation or Q-switched laser operation with pulses of less than 300 ns; and FIG. 7 shows a cavity configuration for mode-coupled laser operation of less than 10 ps or Q-switched laser operation with pulses greater than 300 ns.

DESCRIPTION OF THE PREFERRED EMBODIMENTS

Figure 1:
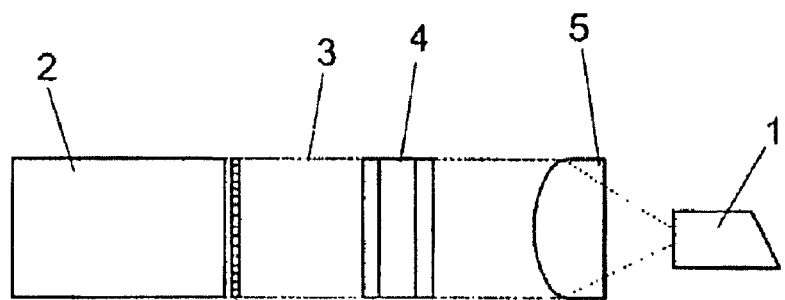
FIG. 1 is a top view showing a pump arrangement according to the invention.

For end-pumping a laser crystal 1, the pump arrangement shown in FIG. 1 contains a pump radiation source 2 in the form of a laser diode bar or an arrangement thereof, whose pump beam 3 is focused by means of two cylindrical lenses 4 and 5 and directed to a beam inlet surface 6 of the laser crystal 1. When entering the laser crystal 1, the pump beam 3 has an asymmetrical cross section with different dimensions perpendicular to one another.

In order to achieve a high pump beam density, is has proven advantageous for improving the beam characteristics of the laser diode bar to collimate the slow axis in a particular way in addition to collimating the fast axis. The individual emitters arranged in a line-shaped manner in the laser diode bar usually take up only part of the available space. The other part is occupied by intermediate spaces, or spacings, which worsen the beam parameter product because the radiating surface increases by the amount of unused space occupied by the intermediate space. An arrangement of collimating lenses in the plane of the intersection of the laser beam bundles eliminates the stagnant ratio, so that an improvement in the beam parameter product by a factor of about 2 can be achieved. The micro-optics 7 which are provided for this purpose are arranged following the pump radiation source 2.

As an alternative to the use of cylindrical optics, it is possible to deliberately increase the residual divergence of the fast axis and to subsequently focus with an aspheric lens. This is advantageous in that the aspheric imaging in direction of the slow axis permits better collimation, but is disadvantageous in that the foci of the fast axis and slow axis are located at different positions in the laser crystal 1.

Figure 2:
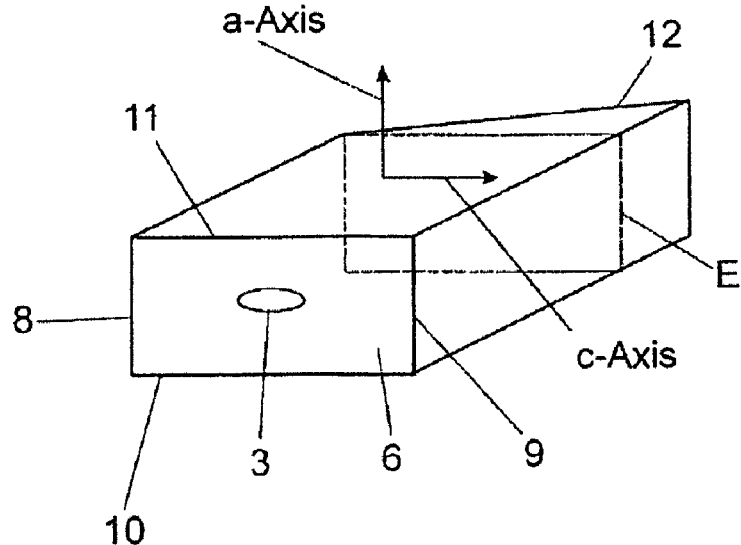
FIG. 2 shows the axis orientation in the laser crystal.

According to FIG. 2, the anisotropic laser crystal 1, for which an Nd:YVO$_4$ crystal with a size of 4×2×6.9 mm$^3$ is used in the present example, is oriented to the pump beam in such a way that its crystallographic c-axis is oriented in the direction of the larger dimension and the crystallographic a-axis, in whose direction the highest values of the crystal breaking limit and of the thermal coefficient of expansion are present, is oriented in direction of the smaller dimension of the pump beam cross section.

It has been shown that when, in addition, the crystal height is reduced in direction of the a-axis and the temperature gradient is accordingly further increased, this results in a substantial increase in the crystal strength in relation to thermal stress. This means that the laser crystal 1 can be operated with substantially higher pump power and pump power density.

For this reason, the laser crystal 1 has a crystal cross section which is penetrated by the pump beam 3 and which has pairs of oppositely located, parallel crystal edges 8, 9, 10 and 11 of different lengths. The crystal edges 8 and 9 having a shorter length than crystal edges 10 and 11 extend in direction of the smaller dimension of the pump beam cross section.

Of course, the preferred edge ratio in a Brewster-cut laser crystal exists only in a portion starting at the beam inlet surface 6 and ending in a plane E, after which the Brewster surface 12 which serves as beam outlet surface and is inclined toward the cavity beam reduces the cross-sectional area and accordingly also changes the edge ratio.

When using a pump beam cross section of 940×330 $\mu m^2$, a pump power of 8 W, which is converted into heat, and a measured thermal lens of $f_x$=600 mm in the horizontal direction and $f_y$=200 mm in the vertical direction can be achieved.

Figures 3, 4:
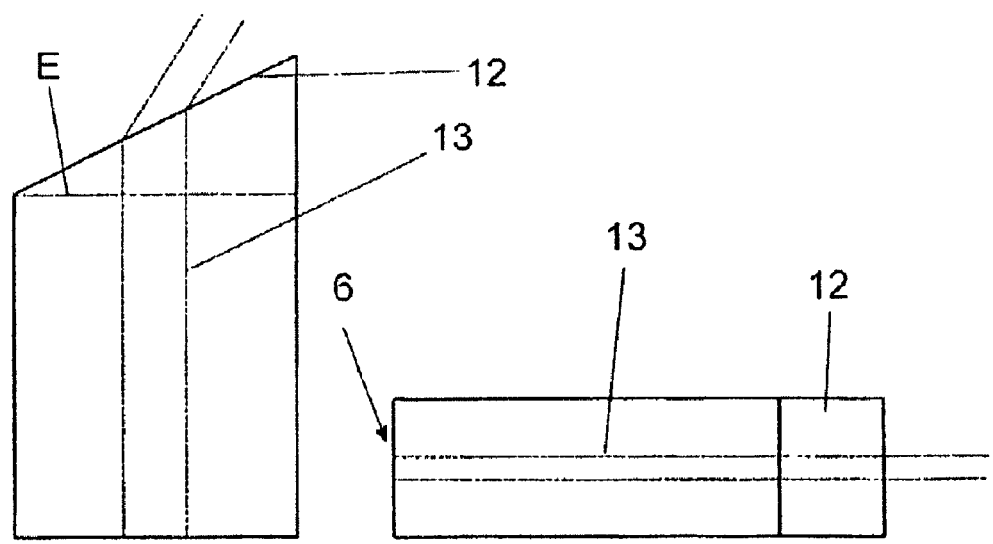
FIG. 3 is a top view showing the mode cross section in a laser crystal.
FIG. 4 is a side view showing the mode cross section in a laser crystal.

The views shown in FIGS. 3 and 4 illustrate the elliptical mode cross section of the laser beam 13 generated by the asymmetric thermal lens and by the Brewster cut of the laser crystal 1. An axial ratio of 1:2 to 1:3 is accordingly adjusted as a whole.

FIG. 5 shows the relationship determined between a decreasing crystal height (length of crystal edges 8, 9) and the maximum temperatures and maximum von Mises comparison stresses in the laser crystal. The latter characterize fracturing of the crystals.

In the linear cavity configuration for CW laser operation or Q-switched laser operation with pulses of less than 300 ns according to FIG. 6, a deflecting mirror 15 is arranged following the Nd:YVO$_4$ laser crystal 1 which is pumped by the pump radiation source 2 by pump optics 14 and out-coupling is carried out by an end mirror 16. Additional asymmetric elements inside the cavity have been avoided. The construction of the deflecting mirror 15 as a spherical mirror facilitates compensation (fine tuning) of beam asymmetries by means of off-axis reflections.

In a mode-coupled cavity which operates with saturable semiconductor absorbers and which has three deflecting mirrors 17, 18 and 19 and an end mirror 20 according to FIG. 7, there are various possibilities for beam out-coupling. For example, a dichroic mirror can be arranged between the laser crystal 1 and the pump optics 14. It is also possible to rotate the polarization of the cavity beam 13 in a defined manner by means of a λ/2 plate, a λ/4 plate and a polarizing beam splitter and to couple out the rotated component in one direction of the beam path. Two output beams can also be coupled out at a deflecting mirror. When the semiconductor absorber is used as a deflecting mirror, the changed phase position of the individual modes compared to the end of the cavity must be taken into account.

While the foregoing description and drawings represent the present invention, it will be obvious to those skilled in the art that various changes may be made therein without departing from the true spirit and scope of the present invention.

What is claimed is:

1. An arrangement for pumping an anisotropic laser crystal comprising:

a pump radiation source for generating a pump beam with an asymmetrical cross section having a smaller dimension in a first direction and a larger dimension in a second direction, said first and second directions being perpendicular to one another;

said anisotropic laser crystal having a first and a second crystallographic axis perpendicular to one another, each axis having a different crystal breaking limit and a different thermal coefficient of expansion;

wherein in the direction of the first crystallographic axis said anisotropic laser crystal has a greater crystal breaking limit in comparison to the second crystallographic axis of said anisotropic laser crystal with a smaller crystal breaking limit and which second crystallographic axis of said anisotropic laser crystal has a smaller thermal coefficient of expansion than the first crystallographic axis of said anisotropic laser crystal;

wherein said anisotropic laser crystal is oriented with said first crystallographic axis in the first direction of the smaller dimension of the pump beam asymmetrical cross section.

2. The arrangement according to claim 1, wherein the anisotropic laser crystal having a crystal cross section which is penetrated by the pump beam, said crystal cross section having a smaller dimension in the first direction of the pump beam asymmetrical cross section that in the second direction of the pump beam asymmetrical cross section.

3. The arrangement according to claim 2, wherein due to the direction-dependent differences in the strengths of the thermal lens there is a laser beam cross section in the laser crystal whose axial ratio is greater than 1:1 and less than 1:3 in directions extending perpendicular to one another.

4. The arrangement according to claim 3, wherein said anisotropic laser crystal is an Nd:YVO$_4$ crystal.

5. The arrangement according to claim 4, wherein the pump radiation is adapted to an elliptic beam cross section by means of two cylindrical lenses.

6. The arrangement according to claim 1, wherein the laser crystal has a Brewster surface as beam outlet surface and the axial ratio is increased by the factor of the ratio of the index of refraction of the laser crystal to the index of refraction of air.

7. The arrangement according to claim 6, wherein said pump radiation source being a diode laser with a line-shaped arrangement of individual emitters emitting beam bundles, said diode laser having a fast-axis and slow-axis which coincide with the first and the second direction of the pump beam asymmetrical cross section respectively, and collimating the pump beam in the direction of the fast-axis and slow-axis, wherein the collimator for collimating the pump beam in the direction of the slow-axis comprises individual lenses which are arranged in a plane of the beam intersection of the beam bundles emitted by the individual emitters.

8. The arrangement according to claim 6, wherein the pump radiation has a defined divergence in the fast-axis direction and focusing is carried out by means of an aspheric lens.

* * * * *